United States Patent
Cook et al.

(10) Patent No.: US 8,476,963 B2
(45) Date of Patent: Jul. 2, 2013

(54) EXPONENTIAL CHARGE PUMP

(75) Inventors: Thomas D. Cook, Austin, TX (US); Jeffrey C. Cunningham, Austin, TX (US); Karthik Ramanan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 108 days.

(21) Appl. No.: 12/984,258

(22) Filed: Jan. 4, 2011

(65) Prior Publication Data

US 2012/0169404 A1 Jul. 5, 2012

(51) Int. Cl.
*G05F 3/08* (2006.01)
*H02M 3/16* (2006.01)

(52) U.S. Cl.
USPC ............................................. 327/536; 363/60

(58) Field of Classification Search
None
See application file for complete search history.

(56) References Cited

U.S. PATENT DOCUMENTS

| 5,436,587 | A | 7/1995 | Cernea |
| 5,740,109 | A | 4/1998 | Morton et al. |
| 5,926,059 | A | 7/1999 | Brani et al. |
| 6,157,242 | A | 12/2000 | Fukui |
| 6,525,949 | B1 * | 2/2003 | Johnson et al. ............ 363/60 |
| 6,661,278 | B1 | 12/2003 | Gilliland |
| 7,005,912 | B2 * | 2/2006 | Nonaka ..................... 327/536 |
| 7,605,640 | B2 * | 10/2009 | Ki et al. ..................... 327/536 |
| 2011/0285455 | A1 * | 11/2011 | Kok et al. .................. 327/536 |

* cited by examiner

*Primary Examiner* — Lincoln Donovan
*Assistant Examiner* — Terry L Englund
(74) *Attorney, Agent, or Firm* — Terrile, Cannatti, Chambers & Holland, LLP; Michael Rocco Cannatti

(57) ABSTRACT

An exponential multistage charge pump is provided wherein node voltages in a pumpcell in one stage of the charge pump are used to control operation of clock drivers in a subsequent stage of the charge pump.

18 Claims, 4 Drawing Sheets

EXPONENTIAL CHARGE PUMP

BACKGROUND OF THE INVENTION

1. Field of the Invention

The present invention is directed in general to the field of information of electronic circuitry. In particular, the present invention relates to systems and methods for providing exponential charge pumps.

2. Description of the Related Art

Charge pumps are commonly used in integrated circuits to increase power supply voltages for specific applications, such as the operation of memory arrays. One common type of charge pump is the "arithmetic" charge pump comprising multiple pump stages, with the final output voltage of the charge pump being a linear multiple of the input voltage. As power supply values decrease and pump output value requirements increase, the number of stages required by an arithmetic pump becomes prohibitive. For example, to achieve 14.5V from a 1.7V supply currently requires eight stages.

Another charge pump configuration is an "exponential" charge pump comprising multiple stages with the increase in voltage being exponentially proportional to the voltage increase of each stage with the exponent being equal to the number of stages. For example, an exponential comprising three stages with each stage doubling the voltage would produce an output voltage equal to (input voltage)*$2^3$, or eight times the input voltage.

In many small non-volatile memory arrays, charge pumps consume a significant portion of the die area. For example, current designs for exponential charge pumps require level shifters and smoothing capacitors that require a large amount of die surface area and also consume a disproportionately high amount of power. It would be desirable to provide a charge that reduces the number of stages and that minimizes the use of level shifters and related circuit components.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
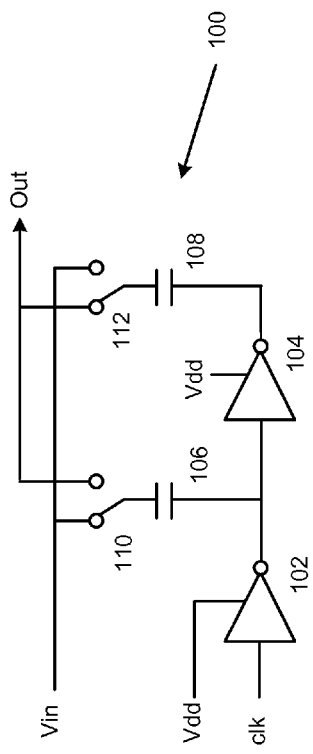
FIG. 1 is an illustration of a prior art charge pump stage.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

Embodiments of a system and methodology are disclosed for charge pumps that can be implemented with the minimum number of stages. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals. For example, selected aspects are shown in block diagram form, rather than in detail, in order to avoid limiting or obscuring the present invention. Such descriptions and representations are used by those skilled in the art to describe and convey the substance of their work to others skilled in the art. Various illustrative embodiments will now be described in detail below with reference to the figures.

Arithmetic charge pumps are pumps that realize the transfer function:

$$Vout=Vin*(N+1),$$

where n is the number of stages in the pump.

FIG. 1 is an illustration of a common prior art charge pump stage 100 comprising inverters 102, 104, and a pair of capacitors 106, 108. The switches 110 and 112 are opened and closed in a coordinated sequence, known to those of skill in the art, to control the charge stored on the capacitors 106, 108 to generate an output voltage, Vout, that is a multiple of the input voltage, Vin.

For the first stage of the pump, the input voltage (Vin) is generally equal to the supply voltage (Vdd) although it can be greater than the supply voltage, in which case the transfer function equation is modified to reflect the additional input voltage. The supply voltage for the inverters must always be less than or equal to the amplitude of the clk signal, however. The switches can be implemented with diodes or Mosfets with gates controlled by voltages within the pump, or cross-coupled inverters.

Figure 2:
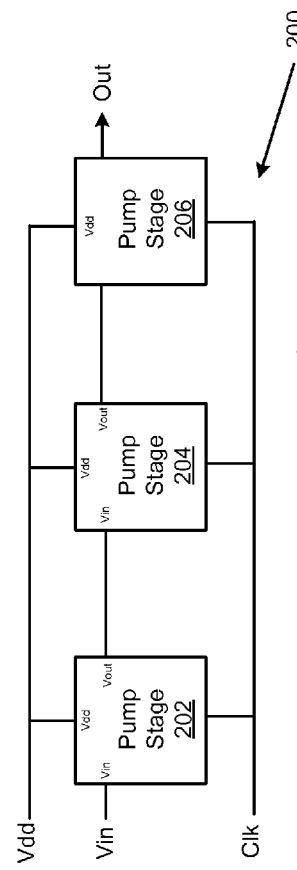
FIG. 2 is an illustration of an arithmetic charge pump comprising three stages.

FIG. 2 is an illustration of an arithmetic charge pump 200 comprising three stages 202, 204, and 206, which are coupled by connecting the output of one stage to the input of the next stage. In the arithmetic charge pump shown in FIG. 2, each stage adds one additional Vdd voltage value to the output voltage value of the previous stage.

As the supply voltage decreases and the pump output voltage requirement increases, the number of stages in an arithmetic pump become prohibitively large. For example, to obtain an output of 14.5V from a 1.7V supply requires eight stages. The number of stages can be reduced by "stacking" the pump stages, i.e. using the output of one set of pump stages to supply the input for the next set of pump stages and including level shifters to increase the amplitude of the clock to the value of the pump's output voltage. The transfer function for the stacked configuration is exponential in form and a high output voltage can be realized with fewer stages than the arithmetic pump.

Figure 3:
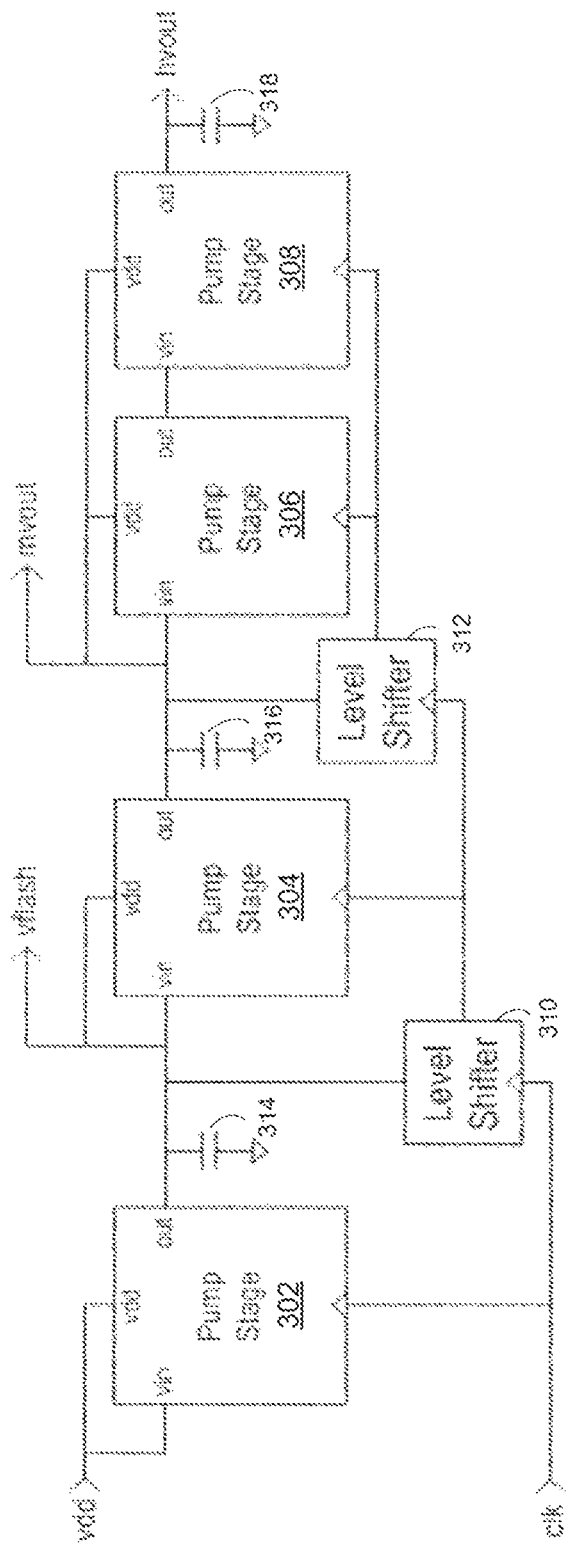
FIG. 3 is an illustration of a charge pump comprising a hybrid stacking topology in accordance with embodiments of the invention.

FIG. 3 illustrates a charge pump comprising a hybrid stacking topology in accordance with embodiments of the invention. Pump stages 302, 304 and 306 are coupled in an exponential configuration with the output of stage 302 providing the input for stage 304. Pump stages 306 and 308 are configured in an arithmetic topology, with the input for stage 306 being provided by the output of stage 304. Level shifters 310 and 312 are operable to increase the amplitude of the clock signal, as discussed hereinabove, and capacitors 314, 316, and 318 are smoothing capacitors to suppress transients.

Exponential charge pumps are particularly useful when several voltages are required from the pump stack. Each of the pumps within the stack can be regulated to a required voltage so that, for example, the output of the bottom pump in the stack can be used to power logic, the output of the middle pump can be used to supply power to the source of a memory bit cell, and the output of the top pump can be used to supply voltage to the control gate of a memory cell.

One of the problems encountered in exponential charge pumps with level shifters relates to the power consumed by the level shifters. Level shifters generate large transients as they switch, and the power to operate them is provided by the lower pumps in the stack. Since large transients on the level shifter supply can easily disrupt the operation of the level shifter, smoothing capacitors are added to the output of each pump in order to minimize the peak amplitude of the switching transients. These smoothing capacitors require a significant amount of die surface area. For situations in which all the pumps' output voltages are used and the lower stages must provide significant power to unrelated circuitry, the shifter power consumption and smoothing capacitors may not be an issue. If only the top pump voltage is used or the output power requirements for the lower pumps in the stack are light, however, the shifter power requirement results in an undesirable increase in the size of the lower pump stages. Since all of the power is drawn from the input of the lowest pump and transferred to the consumption point, each of the lower stages must be large enough to supply power to all of the shifters stacked above them.

Figure 4A:
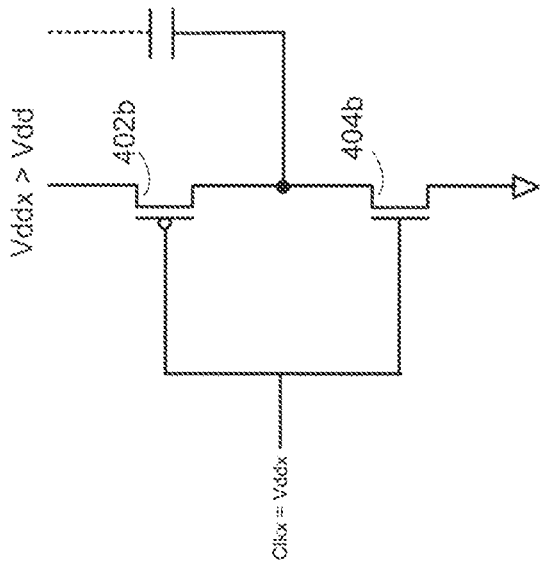
FIGS. 4a-b are illustrations of configurations for controlling the operation of a pMOS device in a charge pump.
Figure 4B:
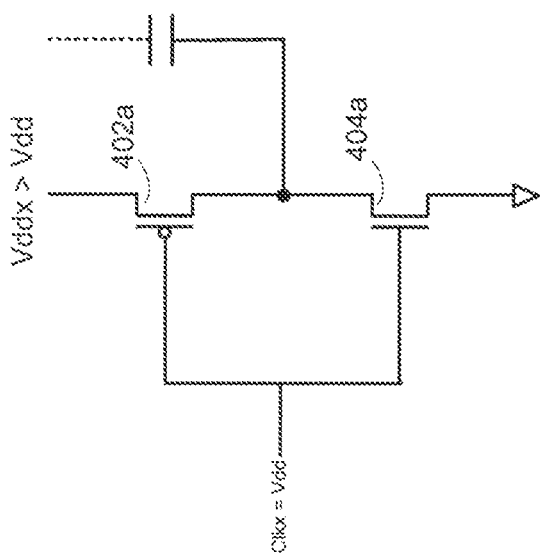

As discussed above, the level shifters are used to provide proper clock amplitude for the inverters at the bottom of the pump stage. To achieve exponential performance the bottom of the capacitor is connected to the pump's input voltage during the discharge phase so the source of the pMOS device in the inverter must be connected to the pump's input voltage. Consequently, in order to turn the pMOS device off, the gate of the transistor must achieve the same voltage as the input voltage during the charging phase. This is illustrated schematically in FIGS. 4a and 4b. In FIG. 4a, the Clkx voltage that is provided to the gates of transistors 402a and 404a is equal to Vdd, while the input voltage, Vddx, is greater than Vdd. Therefore, the pMOS transistor 402a never turns off. In the circuit in FIG. 4b, the Clkx voltage provided to the gates of transistors 402b and 404b is also Vddx, which is equal to the input voltage. Therefore, the pMOS transistor 402b turns off.

Figure 5:
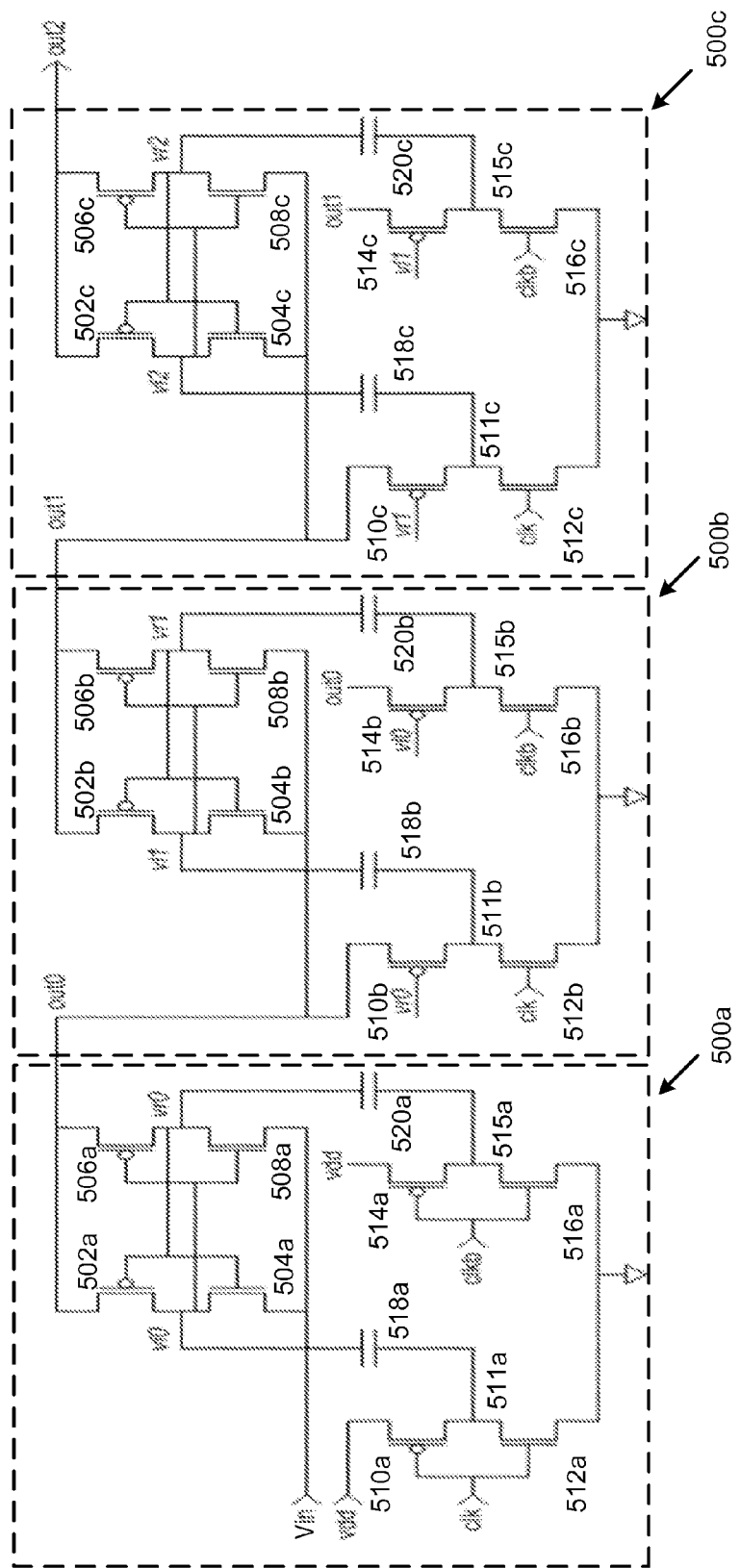
FIG. 5 is a schematic illustration of an embodiment of a stacked charge pump comprising three cross-coupled inverter pump stages.

FIG. 5 is an illustration of an embodiment of a stacked charge pump comprising cross-coupled inverter pump stages 500a, 500b, and 500c operable receive and input voltage "Vin" to generate an exponentially higher output voltage therefrom. As discussed in more detail hereinbelow, the exponential charge pump shown in FIG. 5 is operable to provide adequate voltages to control the pMOS transistors 510a, 514a, 510b, 514b, 510c and 514c without the need for a level shifted voltage on their respective gates.

Referring to stage 500a, a "pumpcell" is provided by the cross-coupled inverters comprising pMOS/nMOS pairs 502a/504a and 506a/508a and the capacitors 518a and 520a. The pMOS/nMOS pairs 510a/512a and 514a/516a operate as clock drivers. The source of pMOS 510a is connected to Vdd and the gates of the pMOS/nMOS pair 510a/512a is controlled by the "clk" clock signal, which is at a Vdd level. The left node "vl 0" of the pMOS/nMOS pair 502a/504a is coupled to node 511a of the pMOS/nMOS pair 510a/512a via capacitor 518a and provides the charge transfer when the clock "clk" transitions from low to high, thereby providing the "pumping" to generate the increased voltage level. Similarly, the source of pMOS 514a is connected to Vdd and the gates of the pMOS/nMOS pair 514a/516a are controlled by the "clkb" clock signal, which may be at a Vdd level, with a phase that is opposite that of the "clk" signal. The right node "vr 0" of the pMOS/nMOS pair 506a/508a is coupled to node 515a of the pMOS/nMOS pair 514a/516a via capacitor 520a and this provides the first stage of charge transfer.

The output voltage "out0" of the first stage, which is twice the first stage input voltage, is provided as an input to the cross-coupled inverters and transistor 510b in the second stage 500b. The configurations shown in stages 500b and 500c are substantially similar to the configuration described for stage 500a, with one major exception. In the configuration shown for stage 500b, the gate of the pMOS transistor 510b is controlled by the signal at node "vr 0" and the pMOS transistor 520b is controlled by the signal at node "vl 0" in stage 500a. By using "vr 0" and "vl 0" as the gate driver voltages for pMOS transistors 510b and 514b, respectively, it is not necessary to use an intermediate level shifter and stability capacitor to turn the devices completely off, since the voltage supplied from nodes "vr 0" and "vl 0" are generally higher than the "out 0" voltage of the first stage 500a. Likewise, in stage 500c, the gate of the pMOS transistor 510c is controlled by the voltage signal at node "vr 1" and the gate of the pMOS transistor 514c is controlled by the voltage signal at node "vl 1" in stage 500b. Again, since the voltages of "vr 1" and "vl 1" are higher than the voltage of "out1," thereby eliminating the need for level shifters and stability capacitors. In the embodiment shown in FIG. 5, the voltages of the respective "vr" and "vl" nodes swing between value of "in" and "out" at the same frequency as "clk" and, therefore, can be used to control the gate of the pMOS devices in the inverters in the successive pump stages in the stack.

In embodiment shown in FIG. 5, three pump stages are stacked so the output will be eight times the input Vdd voltage, the same number of stages in an arithmetic pump will generate four times the Vdd voltage. Because there are no level shifters the output power requirement for each stage is minimal. Although this example uses the cross-coupled inverters topology the same technique can be applied to other topologies.

Those of skill in the art will appreciate that embodiments of the systems and methods disclosed herein provide desired voltage levels using an exponential charge pump that may eliminate the need for level shifters. Elimination of the level shifters may also eliminate the need for smoothing capacitors, thereby reducing the amount of substrate area needed to fabricate the device. The techniques described herein can be used to implement a hybrid charge pump, by modifying the exponentially coupled stages shown in FIG. 3. In particular, the stages 500a and 500b shown in FIG. 5 may substituted for the pump stages 302, 304 shown in FIG. 3 and the level shifters 310, 312, and smoothing capacitors 314, 316 would be removed.

From the foregoing, it should be apparent that improved systems and methods for charge pump implementations have been disclosed herein. In one aspect of the invention a method is provided for using a charge pump to generate an output voltage. The method comprises: providing an input voltage to an input terminal of a first pumpcell of a first stage of said charge pump; using said first stage pumpcell to generate a first stage output voltage from said input voltage and to generate therefrom a first stage node voltage at the junction of a first pMOS/nMOS transistor pair in said first stage pumpcell, wherein said first stage node voltage is higher than said first stage output voltage; providing said first stage output voltage to an input terminal of a clock driver transistor in a second stage of said charge pump; and using said first stage node voltage to control operation of said clock driver transistor to control generation of a second stage output voltage from said second stage of said charge pump. In some embodiments, the method further comprises using a second pumpcell of a second stage of said charge pump to generate a second stage output voltage and a second stage node voltage at the junction of a second pMOS/nMOS transistor pair in said second pumpcell, said second stage node voltage being higher than said second stage output voltage; providing said second stage output voltage to an input terminal of a clockdriver transistor in a third stage of said charge pump; and using said second stage node voltage to control operation of said clock driver transistor in said third stage of said charge pump.

In other aspects of the invention described herein, a novel charge pump is disclosed. In one embodiment, the charge pump a first stage pumpcell comprising first and second cross-coupled inverters coupled to receive an input voltage and to generate a first stage output voltage therefrom; first and second capacitors, each having first and second terminals, said first terminals of said first and second capacitors being coupled to first and second nodes, respectively, of said first and second inverters; first and second clock drivers coupled to said second terminals of said first and second capacitors, respectively, wherein said first and second clock drivers are responsive to first and second clock signals, respectively, to control charging of said first and second capacitors, respectively, thereby generating first and second node voltages at said first and second nodes; and wherein said first and second node voltages are used to control operation of third and fourth clock drivers in a second stage of said charge pump. In some embodiments, the charge pump comprises a second stage comprising: third and fourth cross-coupled inverters in said second stage coupled to receive said first stage output voltage and to generate a second stage output voltage therefrom; third and fourth capacitors, each having first and second terminals, said first terminals of said third and fourth capacitors being coupled to third and fourth nodes, respectively, of said third and fourth inverters; wherein said third and fourth clock drivers are coupled to said second terminals of said first and second capacitors, respectively, and said first and second clock drivers are responsive to said first clock signal and said first and second node voltage signals, respectively, to control charging of said third and fourth capacitors, respectively, thereby generating third and fourth node voltages at said third and fourth nodes; and wherein said first and second node voltages are used to control operation of fifth and sixth clock drivers in a third stage of said charge pump.

Although the described exemplary embodiments disclosed herein are directed to various charge pump systems and methods for using same, the present invention is not necessarily limited to the example embodiments illustrated herein. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of using a charge pump comprising:
   providing an input voltage to an input terminal of a first pumpcell, of a first stage of said charge pump;
   using said first pumpcell to generate a first stage output voltage from said input voltage and to generate therefrom a first stage node voltage at a junction of a first transistor pair in said first pumpcell;
   providing said first stage output voltage to an input terminal of a first clock driver transistor in a second stage of said charge pump; and
   using said first stage node voltage to control operation of said first clock driver transistor to control generation of a second stage output voltage from said second stage of said charge pump, where said charge pump is a hybrid charge pump comprising a plurality of stages in an exponential configuration and a plurality of stages in an arithmetic configuration.

2. The method of claim 1, further comprising:
   using a second pumpcell of said second stage of said charge pump to generate said second stage output voltage and a second stage node voltage at a junction of a second transistor pair in said second pumpcell;
   providing said second stage output voltage to an input terminal of a clock driver transistor in a third stage of said charge pump; and
   using said second stage node voltage to control operation of said clock driver transistor in said third stage of said charge pump.

3. The method of claim 1, wherein said plurality of stages in the exponential configuration comprises a plurality of stacked stages.

4. The method of claim 1,
   wherein the first transistor pair in said first pumpcell comprises a pMOS/nMOS transistor pair having respective current terminals coupled together to provide said junction.

5. The method of claim 1, wherein said first pumpcell further comprises a second transistor pair and wherein said first and second transistor pairs are cross-coupled.

6. The method of claim 1, wherein said second stage comprises a clock driver comprising said first clock driver transistor and a second clock driver transistor.

7. The method of claim 6, wherein operation of said first clock driver transistor is controlled by said first stage node voltage and said second clock driver transistor is controlled by a clock signal.

8. The method of claim 7, wherein said first clock driver transistor comprises a pMOS transistor and said second clock driver transistor comprises an nMOS transistor.

9. The method of claim 7, wherein said clock signal is further used to control operation of a clock driver transistor in the first stage of said charge pump.

10. A charge pump, comprising:
    a first stage pumpcell, of a first stage of the charge pump, comprising first and second inverters coupled to receive an input voltage and to generate a first stage output voltage therefrom;
    first and second capacitors, each having first and second terminals, said first terminals of said first and second capacitors being coupled to first and second nodes, respectively, of said first and second inverters;

first and second clock drivers coupled to said second terminals of said first and second capacitors, respectively, wherein said first and second clock drivers are responsive to first and second clock signals to control charging of said first and second capacitors, respectively, thereby generating first and second node voltages at said first and second nodes; and wherein said first and second node voltages are used to control operation of third and fourth clock drivers in a second stage of said charge pump, and wherein said charge pump is a hybrid charge pump comprising a plurality of stages in an exponential configuration and a plurality of stages in an arithmetic configuration.

11. The charge pump of claim 10, further comprising:

third and fourth inverters in said second stage pumpcell coupled to receive said first stage output voltage and to generate a second stage output voltage therefrom;

third and fourth capacitors, each having first and second terminals, said first terminals of said third and fourth capacitors being coupled to third and fourth nodes, respectively, of said third and fourth inverters in said second stage pumpcell;

wherein said third and fourth clock drivers are coupled to said second terminals of said third and fourth capacitors, respectively, and said third and fourth clock drivers are responsive to said first and second clock signals, respectively, and to said first and second node voltages, respectively, of said first stage pumpcell to control charging of said third and fourth capacitors, respectively, thereby generating third and fourth node voltages at said third and fourth nodes.

12. The charge pump of claim 11, wherein said third and fourth node voltages are used to control operation of fifth and sixth clock drivers in a third stage of said charge pump.

13. The charge pump of claim 10, wherein said plurality of stages in the exponential configuration comprises a plurality of stacked stages.

14. The charge pump of claim 11, wherein said first and second inverters are cross-coupled and said third and fourth inverters are cross-coupled.

15. The charge pump of claim 12, wherein said fifth and sixth clock drivers each comprise a pMOS/nMOS transistor pair and said third and fourth node voltages are provided to the control gates of the respective pMOS transistors in said fifth and sixth clock drivers.

16. The charge pump of claim 15, wherein the control gates of the respective nMOS transistors are controlled by said first and second clock signals, respectively, and wherein the voltage amplitudes of said third and fourth node voltages are higher than the voltage amplitudes of said first and second clock signals.

17. The charge pump of claim 10, wherein said third and fourth clock drivers each comprise a pMOS/nMOS transistor pair and said first and second node voltages are provided to the control gates of the respective pMOS transistors in said third and fourth clock drivers.

18. The charge pump of claim 17, wherein the control gates of the respective nMOS transistors are controlled by said first and second clock signals, respectively, and wherein the voltage amplitudes of said first and second node voltages are higher than the voltage amplitudes of said first and second clock signals.

* * * * *